United States Patent
Hsu et al.

(10) Patent No.: US 9,756,055 B2
(45) Date of Patent: Sep. 5, 2017

(54) METHOD AND APPARATUS FOR CONTROLLING RESOURCES ACCESS

(71) Applicant: International Business Machines Corporation, Armonk, NY (US)

(72) Inventors: Ming-Fa Hsu, New Taipei (TW); Yu Wang, Beijing (CN); Yi Xiao, Shanghai (CN); Guang Yang, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/667,717

(22) Filed: Mar. 25, 2015

(65) Prior Publication Data
US 2015/0326578 A1 Nov. 12, 2015

(30) Foreign Application Priority Data
May 8, 2014 (CN) .......................... 2014 1 0193279

(51) Int. Cl.
*H04L 29/06* (2006.01)

(52) U.S. Cl.
CPC ........ *H04L 63/108* (2013.01); *H04L 63/0807* (2013.01); *H04L 63/10* (2013.01)

(58) Field of Classification Search
CPC ...... H04L 29/06; H04L 63/0807; H04L 63/10
See application file for complete search history.

(56) References Cited

U.S. PATENT DOCUMENTS

| 8,312,064 | B1 * | 11/2012 | Gauvin | G06F 21/6218 707/822 |
| 8,793,509 | B1 * | 7/2014 | Nelson | G06F 21/335 380/227 |
| 2012/0144501 | A1 * | 6/2012 | Vangpat | H04L 63/108 726/28 |
| 2012/0204221 | A1 | 8/2012 | Monjas Llorente et al. | |
| 2014/0033280 | A1 | 1/2014 | Nimashakavi et al. | |

OTHER PUBLICATIONS

Application No. 201410193279.X (China), titled "Method and Apparatus for Controlling Resources Access," filed on May 8, 2014, 31 pages.
Shehab et al., "ROAuth: Recommendation Based Open Authorization," Symposium on Usable Privacy and Security (SOUPS) 2011, Jul. 20-22, 2011, pp. 1-12.
Hardt, "The OAuth 2.0 Authorization Framework," The Internet Engineering Task Force (IETF), Oct. 2012, http://tools.ietf.org/html/rfc6749, Accessed on Mar. 4, 2015, pp. 1-76.

* cited by examiner

*Primary Examiner* — Oleg Korsak
(74) *Attorney, Agent, or Firm* — David Zwick (57) ABSTRACT

Controlling resource access, a first device responsive to a request for access to a resource, determines whether to grant the access to the resource, based on an identity of a requestor requesting the access to the resource. The resource is provided by a second device that is separate from the first device. The first device customizes an access token with an access constraint to control the access to the resource, the access token is generated responsive to the first device determining that, based on the identity of the requestor requesting the access to the resource, the access to the resource is granted.

9 Claims, 7 Drawing Sheets

METHOD AND APPARATUS FOR CONTROLLING RESOURCES ACCESS

BACKGROUND

The present disclosure relates generally to authentication and authorization, and more particularly to controlling resource access.

Third-party authentication and authorization for resource access is known, particularly when a dedicated third party is responsible for the authentication and authorization of a user attempting to access and utilize specific resources through the use of a client application which does not require the user to provide his/her own personal information (e.g., password) to the client application.

As an example, OAuth is a known architecture supporting third-party authentication and authorization. In the OAuth architecture, when a user requests access to a particular resource, a dedicated authorization server performs an identity authentication of both the user and the client application to determine whether to grant the access to the authorized resources. The authorization server is separate from the resource server that provides the resources. If access to the resources is granted, the authentication server may provide an access token corresponding to the granted access to the client application. The client application provides the access token to the resource server to indicate that the access request for the resources has been authorized.

Current third-party authentication and authorization solutions may not provide enough control granularity nor provide enough controllable aspects to reduce improper use of resources, privacy divulgence, etc. through their authentication and authorization services. Current third-party authentication and authorization solutions may be tightly coupled with the resource provider such that they cooperate and operate strictly in accordance with a predetermined protocol or rule to complete authentication of a user identity, authentication of a client application, and authentication of an access token. Such a closely coupled mechanism causes inflexibility of authentication and authorization, preventing, for example, the authentication server from performing a pertinent authentication and authorization process to a different resource and/or a different resource owner.

SUMMARY

Embodiments of the present invention disclose a method, computer program product, and system for controlling resource access. Responsive to a request for access to a resource, a first device determines whether to grant the access to the resource, based on an identity of a requestor requesting the access to the resource. The resource is provided by a second device that is separate from the first device. The first device customizes an access token with an access constraint to control the access to the resource, the access token is generated responsive to the first device determining that, based on the identity of the requestor requesting the access to the resource, the access to the resource is granted.

In another aspect of the present invention, the first device provides the access token, such that the access token is obtained by the second device. The first device receives the access token from the second device and validates the access token by verifying the access constraint in the received access token is satisfied.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

In the accompanying drawings, same or like reference numerals are used to represent the same or similar elements.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
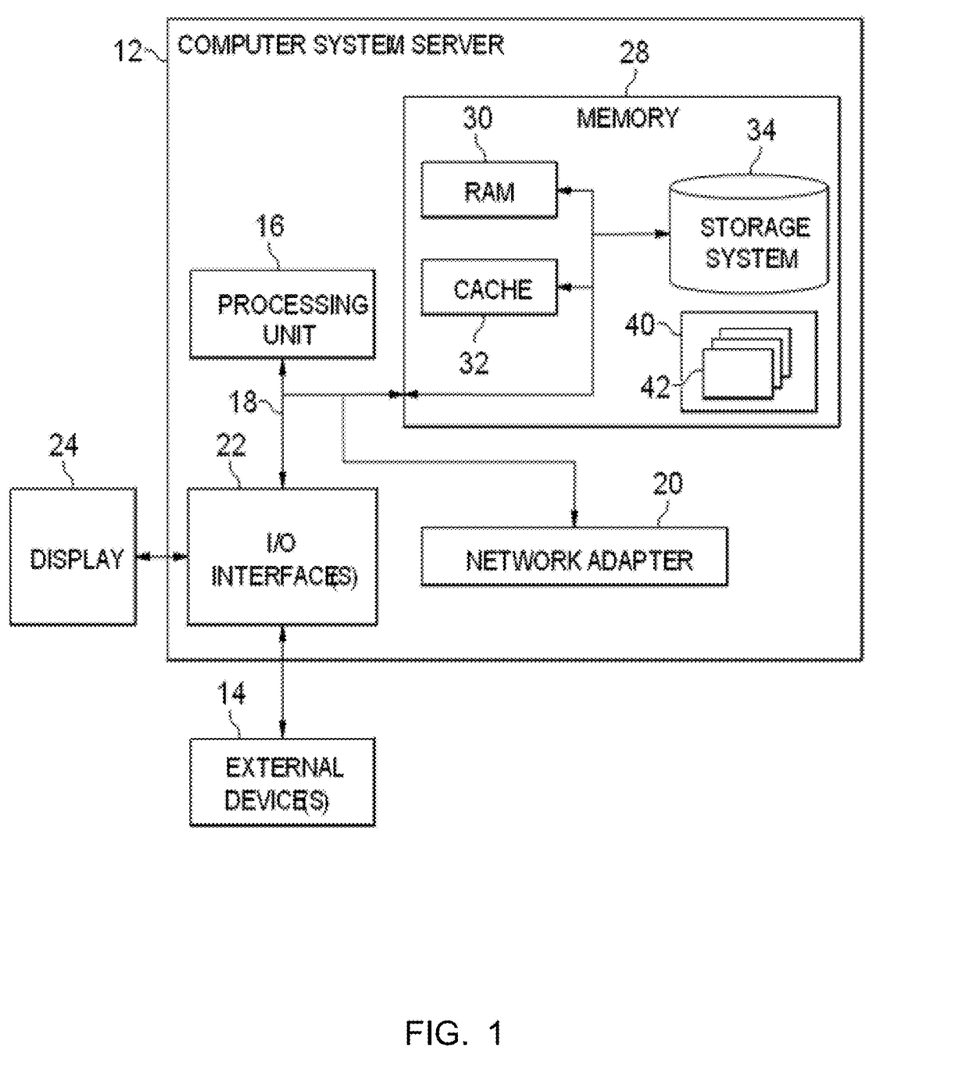
FIG. 1 depicts a block diagram of components of an exemplary computing system/server, in accordance with an embodiment of the present invention.

Referring now to FIG. 1, which depicts a block diagram of components of an exemplary computing system/server 12, in accordance with an embodiment of the present invention. Embodiments of the present invention may be implemented on exemplary computer system/server 12. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Hereinafter, the embodiments of the present invention will be described in detail. According to the exemplary embodiments of the present invention, an access token may not only be used to indicate allowing or rejecting a resource access request, but also may be customized with one or more access constraints. As will be described hereinafter, such access constraints may be generated based on various factors such as the characteristics of the user and/or resources, and provided to the authentication and authorization service in advance or dynamically. In this way, control with a finer granularity and more dimensions may be realized for resource accesses that utilize the access token. In certain embodiments, customized authentication of the user and/or client application may also be realized. Such adaptive customized authentication is beneficial for further enhancing the flexibility of authentication and authorization.

Various embodiments of the present invention may be described hereinafter with reference to OAuth architecture. However, it should be understood that it is only for the purpose of discussion and illustration, not for limiting the scope of the present invention in any manner. On the contrary, the embodiments of the present invention may be applicable to any scenario in which authentication and authorization is performed for a resource access request by an authentication and authorization service separate from a resource provider.

Figure 2:
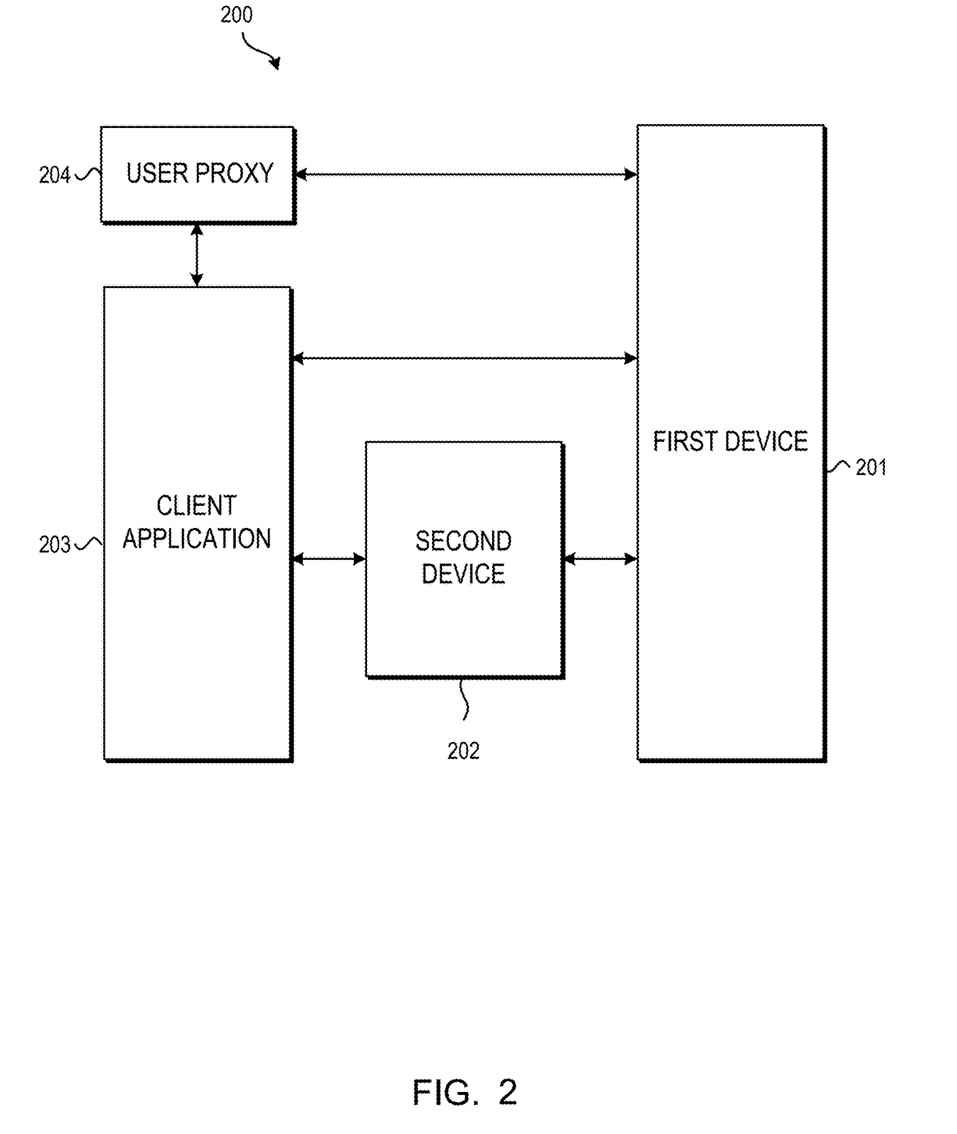
FIG. 2 depicts a block diagram of an environment in which embodiments of the present invention may be implemented, in accordance with an embodiment of the present invention.

FIG. 2 depicts a block diagram of an environment 200 in which embodiments of the present invention may be implemented, in accordance with an embodiment of the present invention. As shown in FIG. 2, the environment 200 comprises a computing device/server 201 responsible for authentication and authorization, and a computing device/server 202 responsible for providing resources. In the context of the present invention, for the sake of discussion, the device 201 is referred to as "a first device," and the device 202 is referred to as "a second device."

As used herein, the term "resource" refers to any type of data or information that may be accessed and used, including, but not limited to, text, image, multimedia, location information, etc. In various embodiments of the present invention, the resource is provided by the second device 202. In various embodiments, a resource owner may store their resource on the second device 202 such that the resource is hosted and provided by the second device 202. Alternately or additionally, the second device 202 may also obtain the resource from any other source. A user may request access to a resource provided by the second device 202 through a client application 203 (e.g., a Web application). The client application 203 may send an authentication request to the first device 201 responsible for authentication and authorization. In certain embodiments, the client application 203 may send the request via a user proxy 204 (e.g., a Web browser).

Responsive to reception of the authentication request, the first device 201 may authenticate the user identity to confirm that the user is authorized to access the resource as requested. If the user passes authentication, in various embodiments, the first device 201 may also authenticate the client application 203 used by the user to access the resource. If the client authentication also passes, the first device 201 may perform an authorization check and provide an access token for the client application 203 to use to access the resource from the second device 202. Typically, the access token is for controlling access to resources and is a credential for allowing the client application 203 to obtain the requested resource. In various embodiments, the second device 202 may re-confirm the validity of the access token, using the services of the first device 201, before providing the client application 203 with access to the resource.

In various embodiments of the present invention, the various devices in the environment 200 may communicate with each other via various kinds of communication mediums. Such communication mediums may include, but are not limited to, a computer network, e.g., a local area network (LAN), a wide area network (WAN), or the Internet; a telecommunications network; a near-field communication network; or any combination of the above.

Figure 3:
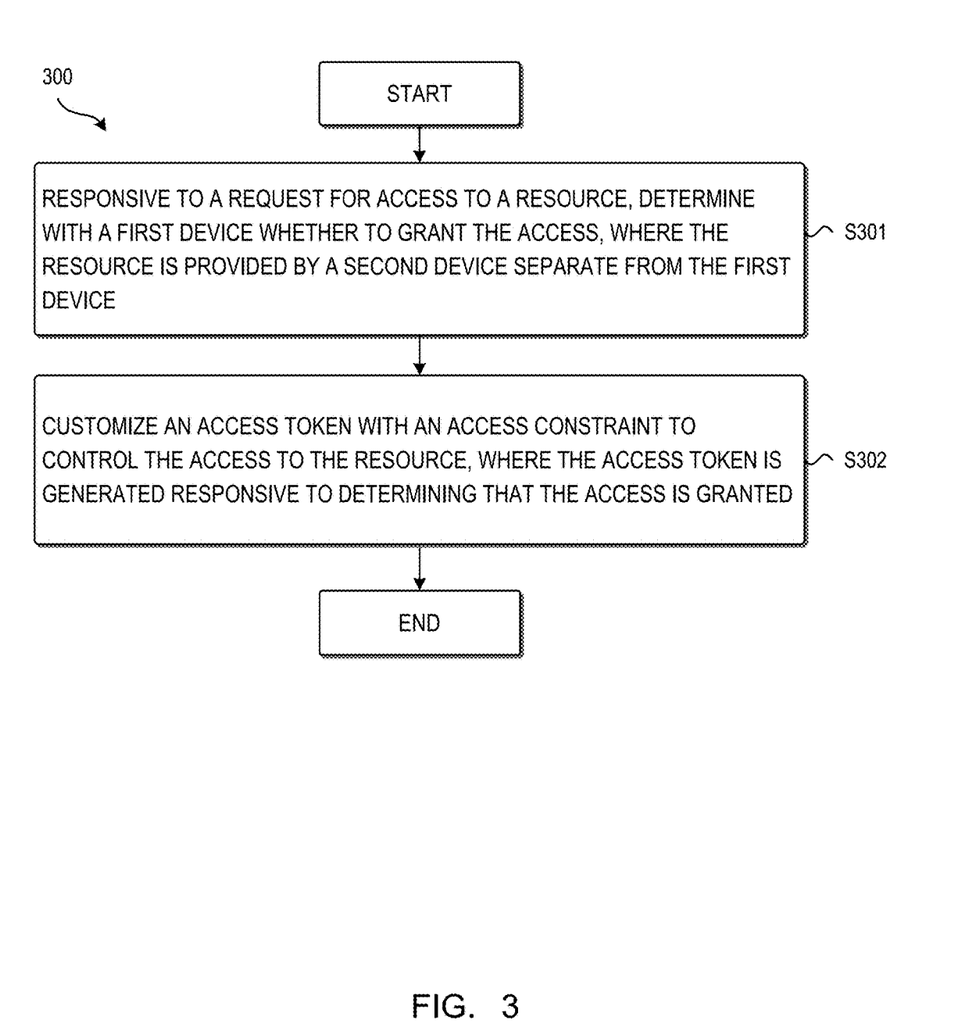
FIG. 3 is a flow chart illustrating a method for controlling access to resources, in accordance with an embodiment of the present invention.

Referring now to FIG. 3, a flow chart illustrating a method 300 for controlling access to resources, in accordance with an embodiment of the present invention. In various embodiments of the present invention, the method 300 is performed on a first device (e.g., a first device 201 as shown in FIG. 2) responsible for authentication and authorization. The method 300 may be performed, for example, by the first device 201, a component of the first device 201, a plug-in deployed on the first device 201, or any appropriate device, separate from the first device 201, capable of working in coordination with the first device 201 to perform the method 300.

As shown in FIG. 3, at S301 of the method 300, responsive to a request for accessing a resource, the first device 201 determines whether or not to grant the access to the resource.

As described above, when a user attempts to access a resource provided by a second device 202 through a client application 203, an authentication request to the first device 201 may be generated. The authentication request may be sent to the first device 201, for example, via a user proxy 204. In various embodiments, the authentication request may not only indicate a to-be-accessed resource, but may also include requirements or constraints relevant to accessing that resource, which will be described in further detail below.

Responsive to the authentication request, the first device 201 may determine whether to allow the access of the requested resource. For example, in various embodiments, at S301, the identity of the user requesting access to a resource may be authenticated, for example, by confirming the identified user is the owner of the requested resource. In various embodiments, the authentication of the user identity may be customized, for example, to consider information about the user such as demographic information, work profile, resource access history, personal credit records, etc. As an example, in certain embodiments, if a user requesting resource access is determined to have a record of violating the rules of use for the resource, a security level may be raised that may impose stricter authentication requirements for that user.

Alternately or additionally, the user identity authentication may also be customized based on information about the equipment used to request the resource access. The information about the user's equipment at the time of the resource access request may include, but is not limited to, device type, processing capability, network condition, storage capability, battery life, etc. In various embodiments, if it is determined that the user is requesting access from a fixed device, such as a desktop computer, a traditional user interface element (e.g., a dialog box) may be used to interface with the user and to collect user information such as username and password for identity authentication. Alternately, if it is determined that the user is requesting access from a mobile device, such as a smartphone, a tablet computer, or a personal digital assistant (PDA), the authentication process may be performed using an authentication manner suitable for the characteristics of the mobile device including, but not limited to, touch-sensitive screen input, graphical password, voice input, fingerprint identification, and iris identification.

Alternately or additionally, the user identity authentication may also be customized based on information about the resource. For example, different resources may have different security levels. Correspondingly, for resources with different security levels, different techniques may be adopted to authenticate the user's identity. For example, in various embodiments, if the security level of the requested resource is low, the user may only be required to provide a password. Alternately, if the security level of the requested resource is high, the user may be required to provide additional information, such as a graphical authentication code, in addition to a password. In various embodiments, a resource owner may be allowed to designate identity authentication requirements for one or more of their resources, for example, when trusting the resource to the second device 202.

In various embodiments of the present invention, the information about the user, user equipment and/or resource may be pre-obtained and stored, and may be accessed and referenced by the first device 201 during use. Alternately, in certain embodiments, one or more pieces of such information may be dynamically collected, and sent, along with an authentication request, to the first device 201.

With continuing reference to FIG. 3, in various embodiments, an authorization decision, at S301, may further include authenticating the client application (e.g., the client application 203 in FIG. 2) through which the user accessed the resource. In certain embodiments, responsive to the user identity passing authentication, the client application 203 may request an access token from the first device 201 before accessing the resource from the second device 202. At this point, the first device 201 may authenticate the client application 203.

Typically, in OAuth, responsive to a successful user identity authentication, the first device 201 may generate a code and provide it to the client application 203. The client application 203 may use the code to complete authentication.

In various embodiments of the present invention, the authentication of the client application 203 may be adaptively customized. An exemplary customization of the authentication process for the client application 203 may be performed based on a predefined protocol or rule (e.g., service level protocol SLA, etc.). In various embodiments, a predetermined protocol may include a certificate, signature, or other authentication information for the client application 203 to be added to the request for the access token transmitted from the client application 203 to the first device 201. The first device 201 may authenticate the client application 203, at least in part, based on such authentication information.

Alternately or additionally, the request for the access token may include a data segment encrypted by a public key. After receiving the request for the access token, the first device 201 may use a corresponding private key to decrypt the encrypted data segment. If the decryption succeeds, the client application 203 passes authentication.

It is to be understood that in embodiments of the present invention, the customized authentication for the user identity and/or client application 203, at S301, is optional. Various embodiments may authenticate according to a traditional authentication standard or specification (e.g., OAuth), without performing any customized authentication.

If it is determined, at S301, to grant access to the requested resource, the first device 201 may generate an access token. The access token indicates the client application 203 is authorized to access the resource provided by the second device 202. Typically, the access token is provided by the first device 201 to the client application 203, which in turn uses the access token to request access to the resource from the second device 202.

In various embodiments of the present invention, the generated access token may be customized, at S302, before it is provided to the client application 203. Specifically, at S302, the access token may be customized using an access constraint, for the requested access, to provide additional controls on the access to the resource. The term "access constraint" refers to any constraint imposed on the access process, when accessing the resource provided by the second device 202.

In various embodiments, the access constraint may include constraints for any aspect of resource access control, such as an access time constraint that designates a particular date, time or time segment when the resource may be accessed, an access frequency constraint that designates the maximum allowed number of accesses to the resource, and an access location constraint that designates that the resource is only accessible to requestors in a given location or within a given geographical range. It should be understood that what are described above are only examples of access constraints and are not intended to limit the scope of the present invention. Any appropriate access constraint falls within the scope of the present invention.

In various embodiments of the present invention, the access constraint may be generated by the first device 201. In certain embodiments, the access constraint may be generated based on resource access requirements designated by the user, for example, through a user interface to the client application 203 and/or user proxy 204.

Figure 4:
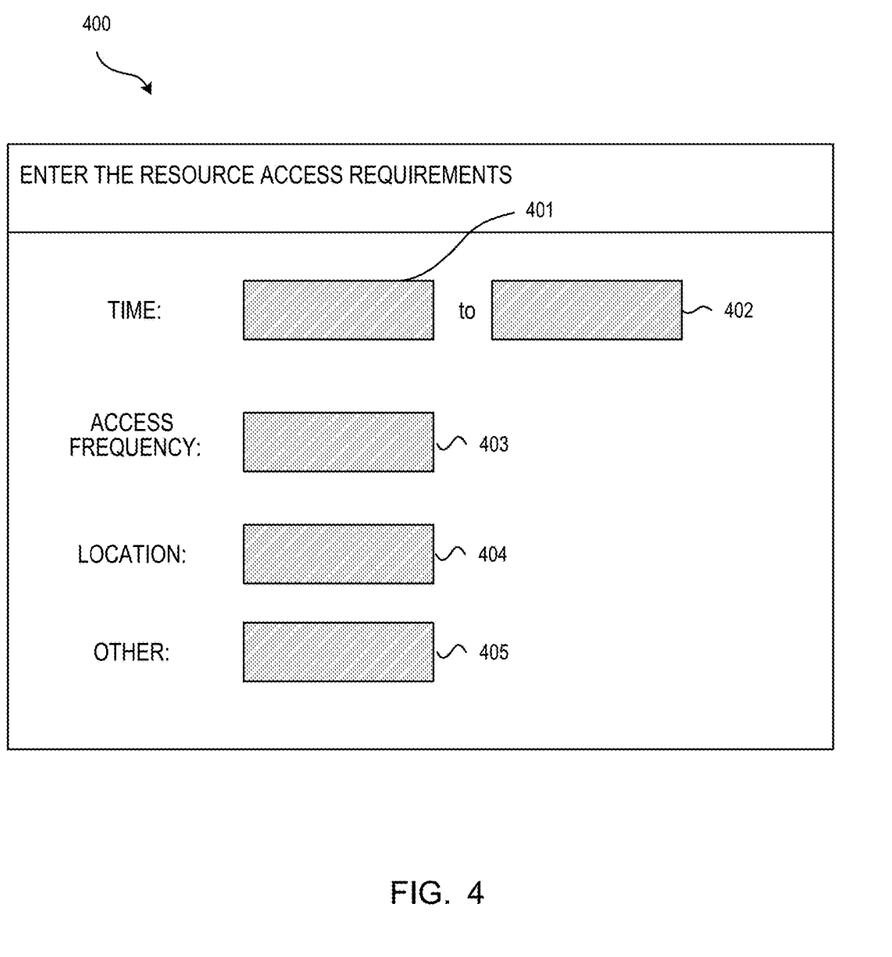
FIG. 4 depicts an exemplary user interface for entering resource access requirements, in accordance with an embodiment of the present invention.

FIG. 4 depicts an exemplary user interface for entering resource access requirements, in accordance with an embodiment of the present invention. In various embodiments, the user interface 400 may be displayed when a user requests, through a client application 203, access to a resource provided by a second device 202. In the exemplary user interface 400, a resource access start time input field 401 and end time input field 402 may be available to limit the accessible time segment for the resource. An access frequency limit input field 403, geographical location requirement input field 404, and/or any other access requirement input field 405 may also be available to enter resource access requirements. The display of input fields 401, 402, 403, 404, 405 may include, but is not limited to, a text box, a drop-down list, and a check box.

The user designated access requirements may be included within the access request for resources. In various embodiments, the user designated access requirements may be sent from the user proxy 204 to the first device 201 with the user identity authentication request. In other embodiments, the user designated access requirements may be included with the request for an access token sent from the client application 203 to the first device 201. Note that although various embodiments treat the user designated access requirements as a logical part of the request, in practice, the specific implementation may be determined flexibly. For example, in certain embodiments, the user designated access requirements may be formatted such that they can be transferred as a field in a corresponding request message. Alternately, the user designated access requirements and request message may also be transferred physically independently.

Alternately or additionally, the resource access requirement may be predefined, for example, in an SLA between the first device 201 and the user and/or the second device 202. In various embodiments, access requirements for a resource may be predefined when the resource is obtained from the second device 202. The predefined access requirements for the resource may be known to the first device 201 or may be forwarded to the first device 201 from the second device 202. In various embodiments, the predefined access requirements may be stored, in association with the user identity and/or resource identity, in any storage location accessible to the first device 201. The first device 201 may retrieve the predefined access requirements and generate an access constraint based on the predefined access requirements to customize the access token.

Referring again to FIG. 3, various embodiments of the present invention may, at S302, customize the access token using an access constraint. In certain embodiments, a generated access constraint may be integrated into the access token and provided with the access token. Other embodiments may store the access constraint and associate the stored access constraint with the access token, rather than directly integrate it into the access token. In such an embodiment, the access constraint may be stored in any storage location that is accessible to the first device 201. The access constraint may also be stored using any appropriate technology, e.g., by virtue of pure text, extensible markup language (XML), database, etc. The association between the access constraint and the access token may be, for example, a unique identifier (such as the serial number of the access token) associated with the stored access constraint.

In various embodiments, customization and generation of the access token may be two separate processes, the access token may first be generated, and then, at S302, the generated access token may be customized. In other embodiments, generation and customization of the access token may be completed together.

The access token generated by the first device 201 may not only indicate allowing or rejecting the user to use the client application 203 to access the resource provided by the second device 202, but may also include controls on access time, access frequency, access location and any other controls for the resource using the access token. Moreover, the authentication of the user identity and/or client application 203 may be customizable allowing a loose coupling between the authentication and authorization service and the resource provider to improve the flexibility of authentication and authorization.

In various embodiments, user identity authentication, client application 203 authentication, and customization and authentication of the access token may be corresponding plug-ins which may be specific to a particular environment or to particular protocols. The plug-ins may be dynamically deployed on the first device 201.

Figure 5:
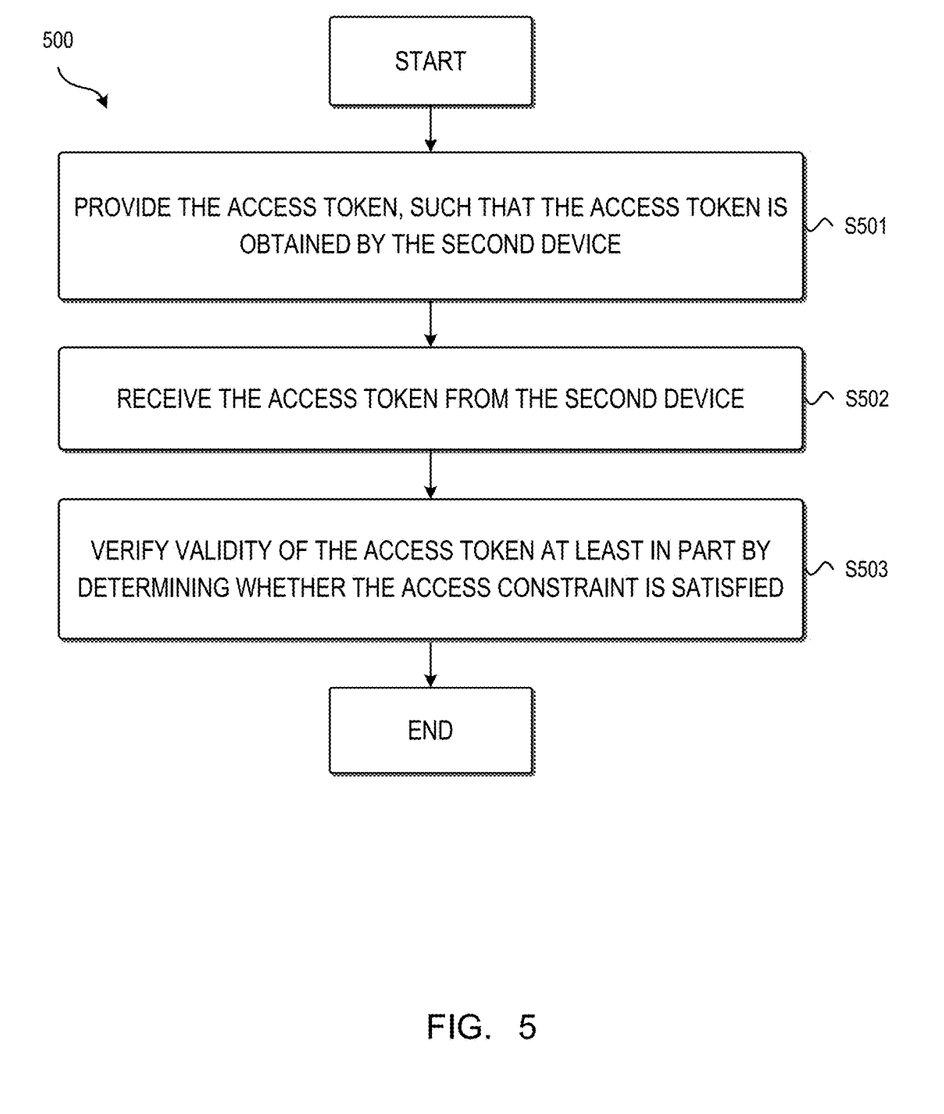
FIG. 5 is a flow chart illustrating a method for using an access token, in accordance with an embodiment of the present invention.

FIG. 5 is a flow chart illustrating a method 500 for using an access token, in accordance with an embodiment of the present invention. In various embodiments, at S501, the first device 201 provides the previously generated and customized access token (from S301 and S302, FIG. 3) to the second device 202. In other embodiments, the first device 201 may provide the access token to the client application 203 which, in turn, may provide the access token to the second device 202 to obtain the requested resource.

After receiving the customized access token, either from the first device 201 or from the client application 203, the second device 202 may transmit the access token to the first device 201 to confirm the access token's validity. Correspondingly, the first device 201 may, at S502, receive the access token from the second device 202.

The first device 201 may, at S503, verify the validity of the received access token at least in part by determining whether the access constraint associated with the access token is satisfied. In various embodiments, the first device 201 may both conventionally verify the validity of the access token as well as determine whether the access constraint is satisfied. As described above, in various embodiments, the access constraint may be integrated into the access token, and in such an embodiment, the first device 201 may directly obtain the access constraint from the received access token. Alternately, the first device 201 may retrieve a stored associated access constraint, from the accessible storage location, using the identification of the access token.

After obtaining the access constraints, the first device 201 may determine whether the current access request for the resource satisfies the constraints. For example, the first device 201 may determine whether the current access is within the access frequency constraint, whether the current time satisfies the access time constraint, whether the current location of the user satisfies the location constraint, etc. In various embodiments, relevant external services may be used to verify the validity of the access token. For example, a GPS location service may be used to determine whether the requesting location satisfies the location constraint associated with the customized access token. In various embodiments, the required services, such as the location service, may be provided by the second device 202, obtained from the user equipment, or provided by any other service providers.

Based on the results of verifying the validity of the access token, access to resources may be allowed or denied. If the first device 201 determines that the access token is valid and the access constraints are satisfied, at S503, the first device 201 may indicate to the second device 202 to provide the requested resource to the client application 203. If the first device 201 determines that the access token is not valid or the access constraints are not satisfied, the first device 201 may indicate to the second device 202 to reject the resource request.

Figure 6:
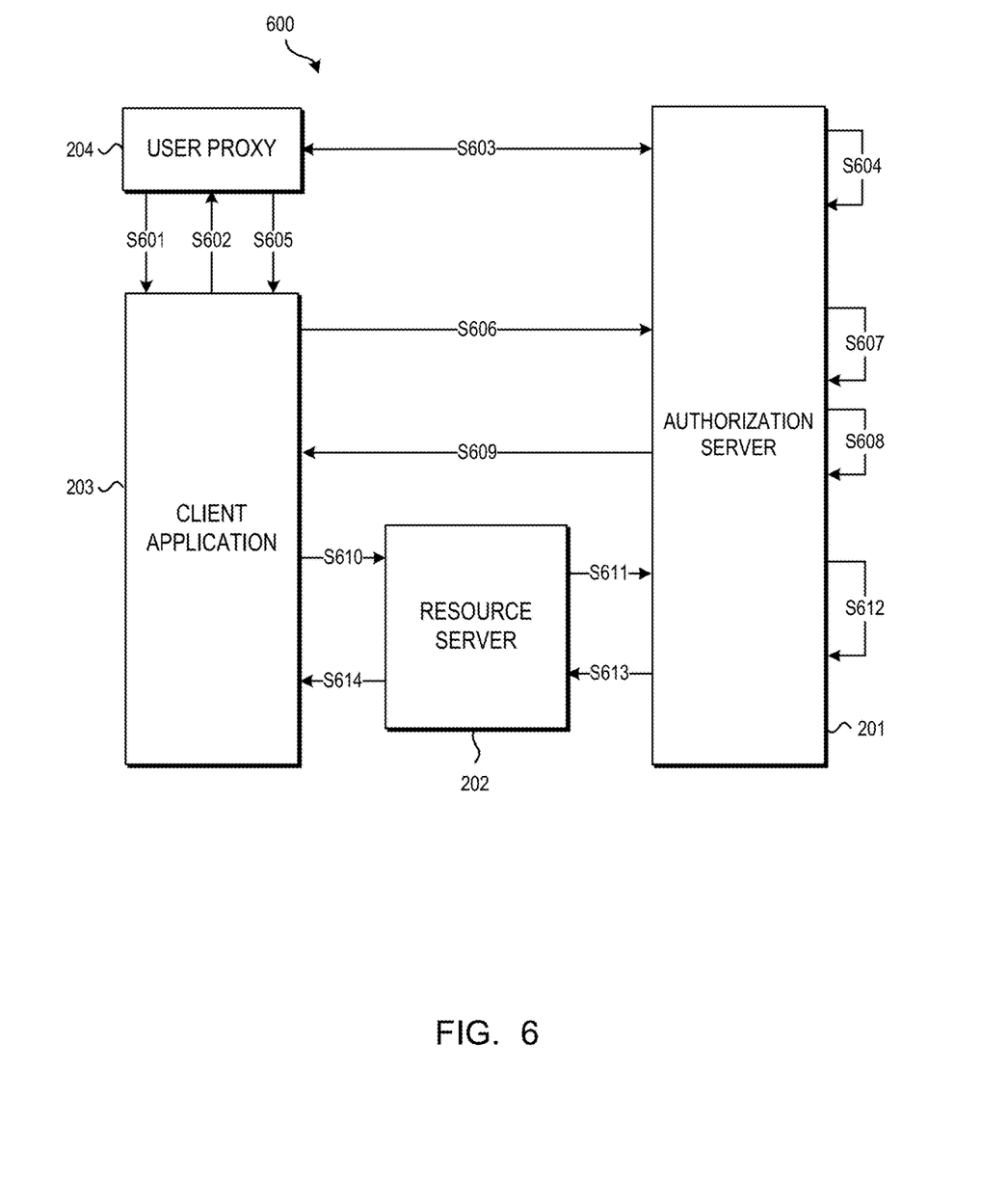
FIG. 6 is a schematic diagram depicting resource access control in an exemplary OAuth environment, in accordance with an embodiment of the present invention.

FIG. 6 is a schematic diagram depicting resource access control in an exemplary OAuth environment 600, in accordance with an embodiment of the present invention. An OAuth environment provides a safe, open, and simple standard for authorizing a user to access a resource. In the exemplary OAuth environment 600, the authorization server may act as the first device 201, described above, while the resource server may act as the second device 202, described above. The exemplary environment 600 is a specific implementation of the environment described above with reference to FIG. 2.

As depicted in FIG. 6, a user proxy 204 (e.g., a Web browser) may be used to access a resource provided by a resource server (e.g., the second device) 202 through a client application 203 (e.g., Web application), at S601.

At S602, the client application 203 may redirect the access request to an authorization server (i.e., the first device 201) using the user proxy 204 which may send an authentication request to the authorization server 201, at S603, to authorize a request to access a resource. In response, at S604, the authorization server 201 may authenticate the user identity. In various embodiments, the authentication of the user may be customized based on the user, user equipment, resource, and/or any other possible relevant factors.

Typically, in an OAuth environment, at S603 and S604, the user's authorization to the client application 203 may also be verified, preventing an unauthorized user from accessing a resource authorized for the client application 203, but not the user. The authorization may be an implicit process, for example, based on predefined configurations. Alternately, the authorization may be explicitly performed, e.g., based on webpage sheet, voice, gesture, and other user inputs. A user's authorization information, with respect to the client application 203, may be stored in a storage location accessible to the authorization server 201, to be used by the authorization server 201 when generating an access token.

If a user identity passes authentication, the user proxy 204 may forward a code generated by the authorization server 201 to the client application 203, at S605. The client application 203 may then request an access token, at S606, from the authorization server 201. In various embodiments, the request for an access token, at S606, may include authentication information specific to the client application 203, e.g., certificate, signature, encrypted data segment, etc. in addition to the code previously generated by the first device 201.

Responsive to the request, the authorization server 201 may perform a customized authentication of the client application 203, at S607, based on the authentication information in the access token request. If the authentication passes, at S608, the access token may be generated and customized by the authorization server 201. As described above, in embodiments of the present invention, the customized access token may not only indicate that the access request is granted, but also may have one or more access constraints added for a more comprehensive and refined control of the resource. Access constraints associated with the access token may be integrated into the access token, or may be stored in any storage device accessible to the authorization server 201. In OAuth architecture, the authorization information of the user, with respect to the client application 203, may, at S604, be converted into corresponding constraints and included in the access token.

The customized access token may be provided to the client application 203 from the authorization server 201, at S609. The client application 203 may then request a resource from the resource server 202, at S610, using the provided access token. Responsive to the request, the resource server 202 may, at S611, pass the customized access token to the authorization server 201 to verify the validity of the access token. In various embodiments of the present invention, the authorization server 201 may verify, at S612, whether the access token is valid, at least determining whether the access constraints associated with the access token are satisfied. As described above, when determining whether an access constraint is satisfied, external services, e.g., location service, may be needed.

If the authorization server 201 verifies the access token as valid, the authorization server 201 confirms, at S613, to the resource server 202 that the token is valid. The resource server 202 may then return the requested resource to the client application 203, at S614.

Figure 7:
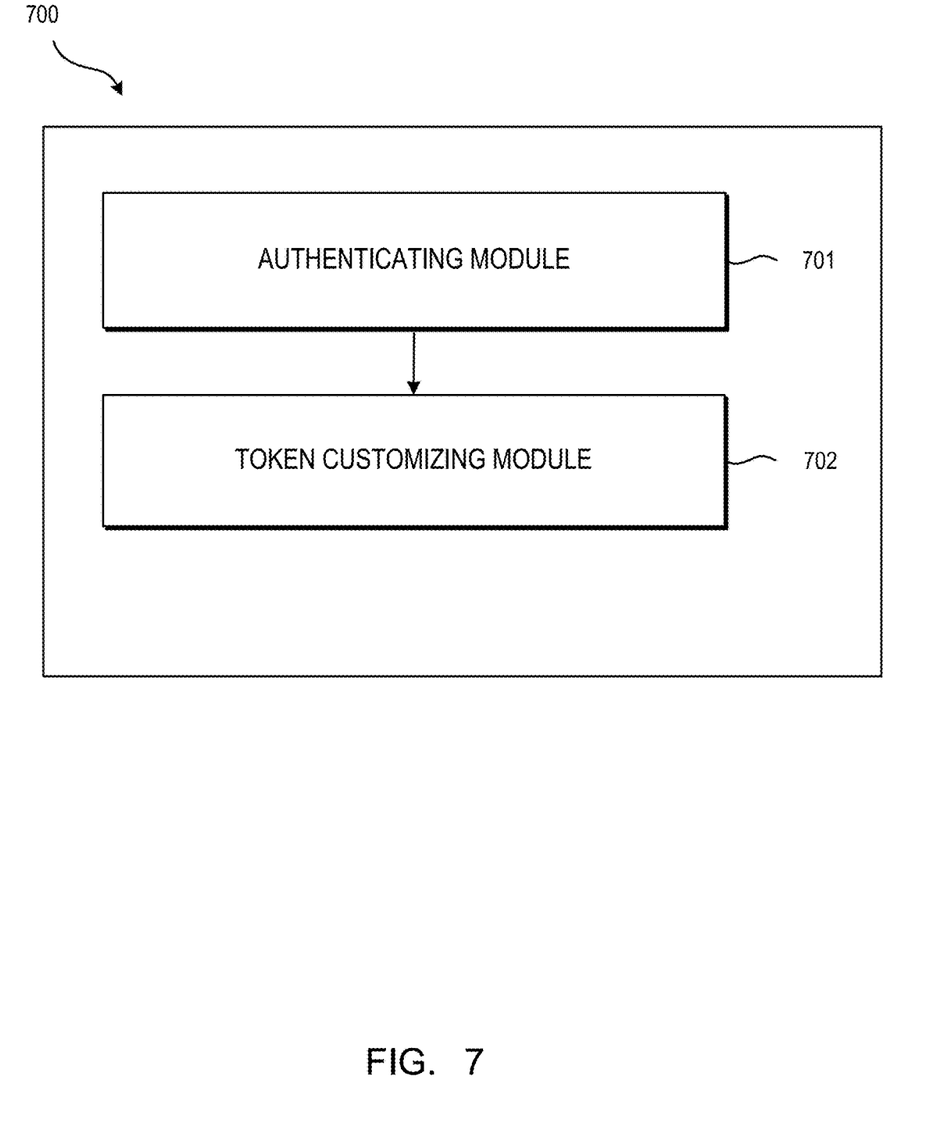
FIG. 7 depicts a block diagram of an apparatus for controlling access to resources, in accordance with an embodiment of the present invention.

FIG. 7 depicts a block diagram of an apparatus 700 for controlling access to resources, in accordance with an embodiment of the present invention. As depicted in FIG. 7, the apparatus 700 may include an authenticating module 701 configured to, responsive to a request for access to a resource, determine with a first device 201 whether to grant the access to the resource, the resource provided by a second device 202 that is separate from the first device 201; and a token customizing module 702 configured to customize an access token with an access constraint to control the access to the resource, the access token generated responsive to determining that the access to the resource is granted.

It should be noted that for the sake of clarity, FIG. 7 does not show optional modules or sub-modules included in the apparatus 700. All features and operations as described above are suitable for the apparatus 700, respectively, which are thus not detailed here. Besides, partitioning of modules or sub-modules in the apparatus 700 is not limitative, but exemplary, intended to describe its main functions or operations logically. Functions of one module may be implemented by a plurality of modules; in turn, a plurality of modules may also be implemented by one module.

Moreover, the modules comprised in the apparatus 700 may be implemented in various manners, including software, hardware, firmware, or any random combination thereof. For example, in certain embodiments, the apparatus 700 may be implemented by software and/or firmware. Alternately or additionally, the apparatus 700 may be partially or completely implemented based on hardware. for example, one or more modules in the apparatus 700 may be implemented as an integrated circuit (IC) chip, an application-specific integrated circuit (ASIC), a system on chip (SOC), a field programmable gate array (FPGA), etc. In various embodiments, the apparatus 700 may be implemented as a plug-in deployed on the first device 201, as a component which is a part of the first device 201, or as an independent device working in coordination with the first device 201.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method for controlling resource access, the method comprising:
    receiving, by an authorization program on an authorization server from a user computing device, an authorization request to authorize access to a data resource on a resource server, wherein the authorization request is in response to a request, received by an application server from a user computing device, to access the data resource on the resource server by a client application on an application server, the resource access request including a user ID and user equipment information associated with the user computing device, and the resource access request having been redirected to the authorization server by the client server via the user computing device;
    authenticating, by the authorization server, the user ID, based on information about a user associated with the user ID, and, if the user equipment information indicates that the user computing device is a mobile device, authenticating using biometric information suitable for the characteristics of the mobile device;
    verifying, by the by the authorization server, whether the user ID has authorization to the client application;
    authenticating, by the authorization server, the client application that is requesting access to the data resource, based on one or more items from the list consisting of: a certificate, a signature, and an encrypted data segment; wherein the one or more items are included in the authorization request received from the user computing device;
    in response to the authorization server authenticating the user ID, and verifying that the user ID has authorization to the client application, and authenticating the client application, transmitting, by the authorization server, a code to the client application;
    in response to receiving, by the authorization server from the client application, a request for an access token, the request including the code, and one or more items from the list consisting of the certificate, the signature, and the encrypted data segment, generating, by the authorization server, an access token, based on the access token request;
    generating, by the authorization server, data resource access constraints, based on information associated with the user ID, wherein the access constraints specify: an access time constraint that designates a particular date, time or time segment when the resource may be accessed by the user ID; an access frequency constraint that designates the maximum allowed number of accesses to the resource by the user ID; and an access location constraint that designates that the resource is only accessible to the user ID from a user computing device in a specified geographical location;
    integrating, by the authorization server, the generated data access restraints into the generated access token;
    transmitting, by the authorization server to the client application, the generated access token;
    in response to receiving, by the authorization server from the resource server, the generated access token, wherein the generated access token was received by the resource server from the client application, determining, by the authorization server, whether the generated access token is valid, and whether the generated data access restraints that are integrated into the access token are satisfied;
    in response to determining, by the authorization server, that the generated access token is valid and that the generated data access restraints that are integrated into the access token are satisfied, confirming, by the authorization server to the resource server, that the generated access token is valid;
    whereby in response to receiving, by the resource server, confirmation from the authorization server that the access token is valid, the resource server allows the requested access by the client application to the data resource.

2. The method of claim 1, wherein authenticating, by the authorization server, the user ID, based on information about a user associated with the user ID, further comprises:
    if a user requesting resource access is determined to have a record of violating the rules of use for the resource, a security level may be increased that may impose stricter authentication requirements for that user, wherein increasing the security includes requiring an increasing number of the following: a password, a graphical authentication code, voice input, fingerprint identification, and iris identification.

3. The system of claim 1, wherein the biometric information is one or more from the list consisting of: voice input, fingerprint identification, and iris identification.

4. A computer program product for controlling resource access, the computer program product comprising one or more non-transitory computer readable storage medium and program instructions stored on at least one of the one or more non-transitory computer readable storage medium, the program instructions being executable by an authorization server to cause the authorization server to perform a method comprising:

receiving, by an authorization program on an authorization server from a user computing device, an authorization request to authorize access to a data resource on a resource server, wherein the authorization request is in response to a request, received by an application server from a user computing device, to access the data resource on the resource server by a client application on an application server, the resource access request including a user ID and user equipment information associated with the user computing device, and the resource access request having been redirected to the authorization server by the client server via the user computing device;

authenticating, by the authorization server, the user ID, based on information about a user associated with the user ID, and, if the user equipment information indicates that the user computing device is a mobile device, authenticating using biometric information suitable for the characteristics of the mobile device;

verifying, by the by the authorization server, whether the user ID has authorization to the client application;

authenticating, by the authorization server, the client application that is requesting access to the data resource, based on one or more items from the list consisting of: a certificate, a signature, and an encrypted data segment; wherein the one or more items are included in the authorization request received from the user computing device;

in response to the authorization server authenticating the user ID, and verifying that the user ID has authorization to the client application, and authenticating the client application, transmitting, by the authorization server, a code to the client application;

in response to receiving, by the authorization server from the client application, a request for an access token, the request including the code, and one or more items from the list consisting of the certificate, the signature, and the encrypted data segment, generating, by the authorization server, an access token, based on the access token request;

generating, by the authorization server, data resource access constraints, based on information associated with the user ID, wherein the access constraints specify: an access time constraint that designates a particular date, time or time segment when the resource may be accessed by the user ID; an access frequency constraint that designates the maximum allowed number of accesses to the resource by the user ID; and an access location constraint that designates that the resource is only accessible to the user ID from a user computing device in a specified geographical location;

integrating, by the authorization server, the generated data access restraints into the generated access token;

transmitting, by the authorization server to the client application, the generated access token;

in response to receiving, by the authorization server from the resource server, the generated access token, wherein the generated access token was received by the resource server from the client application, determining, by the authorization server, whether the generated access token is valid, and whether the generated data access restraints that are integrated into the access token are satisfied;

in response to determining, by the authorization server, that the generated access token is valid and that the generated data access restraints that are integrated into the access token are satisfied, confirming, by the authorization server to the resource server, that the generated access token is valid;

whereby in response to receiving, by the resource server, confirmation from the authorization server that the access token is valid, the resource server allows the requested access by the client application to the data resource.

5. The computer program product of claim 4, wherein authenticating, by the authorization server, the user ID, based on information about a user associated with the user ID, further comprises:

if a user requesting resource access is determined to have a record of violating the rules of use for the resource, a security level may be increased that may impose stricter authentication requirements for that user, wherein increasing the security includes requiring an increasing number of the following: a password, a graphical authentication code, voice input, fingerprint identification, and iris identification.

6. The system of claim 4, wherein the biometric information is one or more from the list consisting of: voice input, fingerprint identification, and iris identification.

7. A computer system for controlling resource access embodied in an authorization server, the computer system comprising one or more processors, one or more computer readable memories, one or more computer readable tangible storage medium, and program instructions stored on at least one of the one or more storage medium for execution by at least one of the one or more processors via at least one of the one or more memories to cause the authorization server to perform a method comprising:

receiving, by an authorization program on an authorization server from a user computing device, an authorization request to authorize access to a data resource on a resource server, wherein the authorization request is in response to a request, received by an application server from a user computing device, to access the data resource on the resource server by a client application on an application server, the resource access request including a user ID and user equipment information associated with the user computing device, and the resource access request having been redirected to the authorization server by the client server via the user computing device;

authenticating, by the authorization server, the user ID, based on information about a user associated with the user ID, and, if the user equipment information indicates that the user computing device is a mobile device, authenticating using biometric information suitable for the characteristics of the mobile device;

verifying, by the by the authorization server, whether the user ID has authorization to the client application;

authenticating, by the authorization server, the client application that is requesting access to the data resource, based on one or more items from the list consisting of: a certificate, a signature, and an encrypted data segment; wherein the one or more items are included in the authorization request received from the user computing device;

in response to the authorization server authenticating the user ID, and verifying that the user ID has authorization to the client application, and authenticating the client application, transmitting, by the authorization server, a code to the client application;

in response to receiving, by the authorization server from the client application, a request for an access token, the request including the code, and one or more items from the list consisting of the certificate, the signature, and the encrypted data segment, generating, by the authorization server, an access token, based on the access token request;

generating, by the authorization server, data resource access constraints, based on information associated with the user ID, wherein the access constraints specify: an access time constraint that designates a particular date, time or time segment when the resource may be accessed by the user ID; an access frequency constraint that designates the maximum allowed number of accesses to the resource by the user ID; and an access location constraint that designates that the resource is only accessible to the user ID from a user computing device in a specified geographical location;

integrating, by the authorization server, the generated data access restraints into the generated access token;

transmitting, by the authorization server to the client application, the generated access token;

in response to receiving, by the authorization server from the resource server, the generated access token, wherein the generated access token was received by the resource server from the client application, determining, by the authorization server, whether the generated access token is valid, and whether the generated data access restraints that are integrated into the access token are satisfied;

in response to determining, by the authorization server, that the generated access token is valid and that the generated data access restraints that are integrated into the access token are satisfied, confirming, by the authorization server to the resource server, that the generated access token is valid;

whereby in response to receiving, by the resource server, confirmation from the authorization server that the access token is valid, the resource server allows the requested access by the client application to the data resource.

8. The system of claim 7, wherein authenticating, by the authorization server, the user ID, based on information about a user associated with the user ID, further comprises:

if a user requesting resource access is determined to have a record of violating the rules of use for the resource, a security level may be increased that may impose stricter authentication requirements for that user, wherein increasing the security includes requiring an increasing number of the following: a password, a graphical authentication code, voice input, fingerprint identification, and iris identification.

9. The system of claim 7, wherein the biometric information is one or more from the list consisting of: voice input, fingerprint identification, and iris identification.

* * * * *